United States Patent Office 3,049,607
Patented Aug. 14, 1962

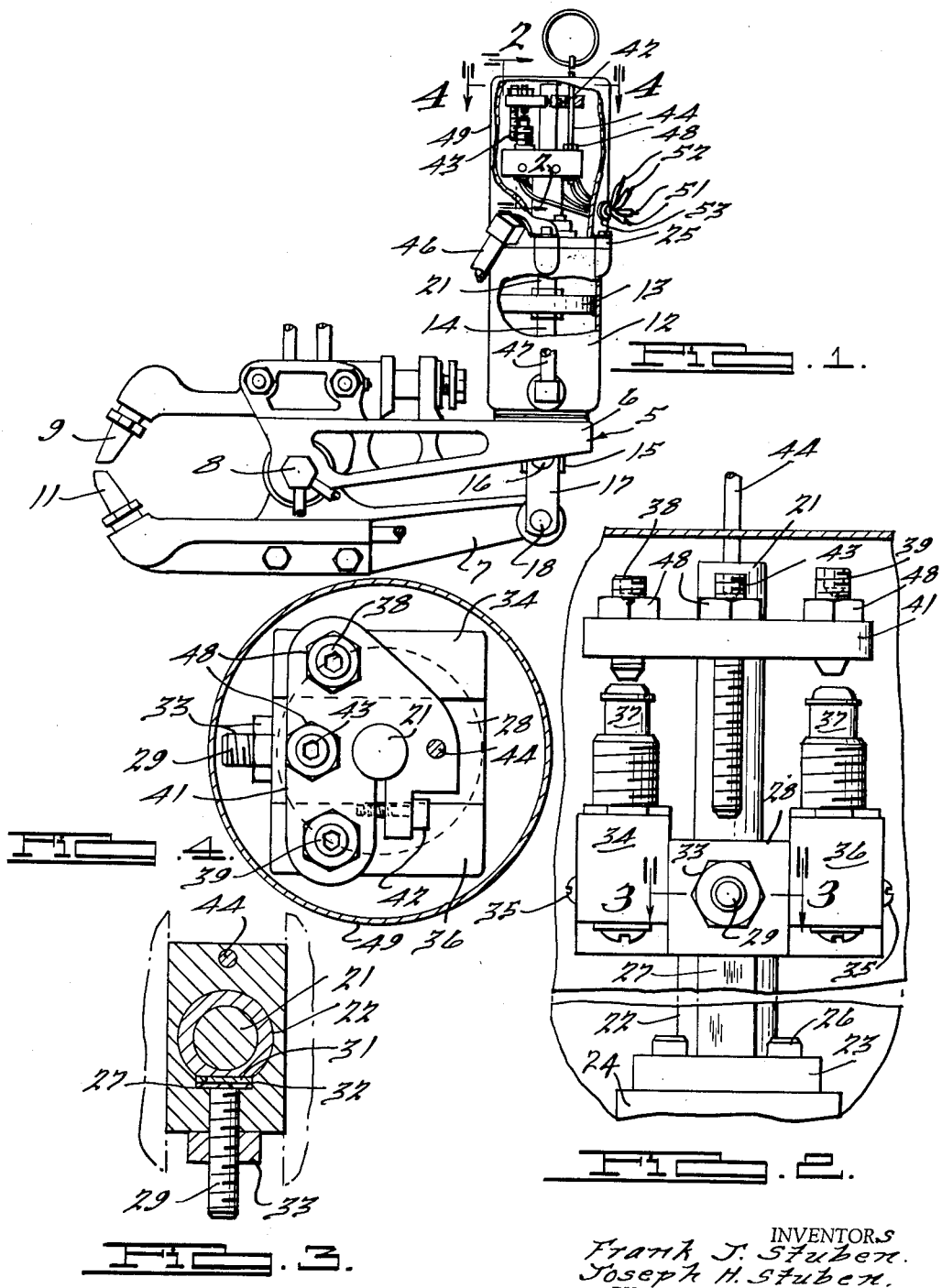

3,049,607
WELD CONTROL UNIT AND METHOD
Frank J. Stuben, 240 Girard, and Joseph H. Stuben, 912 N. Edgeworth Road, both of Royal Oak, Mich., assignors of one-half to Franklin B. Conte, Royal Oak, and Michael Stuben, Detroit, Mich.
Filed Feb. 20, 1961, Ser. No. 90,553
7 Claims. (Cl. 219—89)

This invention relates to current control devices, and particularly to a control device which delivers current to welding electrodes in conformity to the thickness of the material to be welded.

While certain devices have been employed heretofore to control the amount of current delivered for welding material of different thicknesses, the present invention pertains to a simple device which is applied to a welding gun and which automatically controls the delivery of a proper amount of current to the material to be welded when the thickness thereof varies. The device may be adjusted from time to time to compensate for the wear of the electrodes to prevent any damage ocurring to elements of the device. The device embodies an element having a pair of switches attached thereto. The element is slidable upwardly and downwardly on a sleeve secured to the end of a cylinder. A rod extends through the sleeve and is secured to the piston rod of the actuating piston disposed within the cylinder. A plate is carried by the rod having a setscrew which engages and advances the slidable element as wear occurs to the welding electrodes. The plate has an aperture through which the body of a bolt extends which is screwed into the slidable element for returning the element to its initial position upon the upward movement of the rod and plate. In this manner, the switches are disposed in the same relationship to the operating fingers each time the rod is actuated and the slidable element advanced. When the electrodes grip material to be welded which is substantially thick, the one finger operates the stem of one of the switches to complete a circuit to a relay of a time control device. The relay regulates the delivery of current to the electrodes, the duration of the delivery and point of the A.C. cycle at which the current is delivered. When the electrodes grip the material to be welded which is of less thickness, the same switch is operated along with the second switch which energizes a relay to open the circuit completed by the first switch. The second switch also energizes a relay of a second time control device which supplies the same or a less amount of current, for the same or a less amount of time, from the same or a different part of the A.C. cycle.

When initially setting the device, the threaded stud which compensates for the wear of the electrode is adjusted on the plate to engage the slidable element of the device when the electrodes grip the material to be welded. Initially the element will not be moved until wear occurs to the electrodes, after which the plate will move down farther and therefore move the element and switches downwardly therewith to have the plungers of the switches in position to be operated when the electrodes grip the material to be welded. The slideable element and switches are returned to their initial position when the worn electrodes are replaced.

Accordingly, the main objects of the invention are: to provide a device which senses the thickness of the material to be welded and controls the delivery of a proper amount of current to the electrodes of the welding gun; to provide a device having a movable element supporting a pair of switches which are actuated in sequence by fingers on a plate which is moved when the electrodes of a welding gun are moved into work engagement with material to be welded; to have one or the other of a pair of switches operated to control the current supplied to the welding electrodes as they measure the thickness of the material to be welded when moved into engagement therewith; to advance the switches of a welding device as the electrodes thereof wear so that the operation of the switches occurs as the electrodes engage the material being welded, and, in general to provide a device for controlling the delivery of current in an amount conforming to the thickness of the material to be welded which is simple in construction, positive in operation and economical to manufacture.

Other objects and features of novelty of the invention will be specifically pointed out or will become apparent when referring, for a better understanding of the invention, to the following description taken in conjunction with the accompanying drawing, wherein:

FIGURE 1 is a broken view in elevation of a welding gun having a device of the present invention mounted thereon;

FIG. 2 is an enlarged, broken sectional view of the structure illustrated in FIG. 1, taken along the line 2—2 thereof;

FIG. 3 is a sectional view of the structure illustrated in FIG. 2, taken along the line 3—3 thereof, and FIG. 4 is a sectional view of the structure illustrated in FIG. 1, taken along the line 4—4 thereof.

A welding gun 5 of conventional form is illustrated as having arms 6 and 7 secured together by a pivot 8. The forward ends of the arms support electrodes 9 and 11 and through the movement of the opposite ends of the arms away from each other the electrodes are moved to grip the material to be welded therebetween. A cylinder 12 contains a piston 13 which is connected to a piston rod 14 that has a head 15 connected by a pivot 16 to a link 17 which is secured by a pivot 18 to the end of the arm 7. The link 17 permits the arcuate movement of the pivot 18 out of exact alignment with the piston rod 14 as the end of the arm 7 is moved about the pivot 8.

The device of the present invention has a rod 21 secured to the piston rod 14 through a threaded connection therewith. A sleeve 22 extends over the rod 21 and is secured by its flange 23 to a boss 24 on the head 25 of the cylinder 12 by screws 26. A sealing element, such as an O-ring, may be provided on the inner face of the boss 24 which engages the rod 21 and provides a seal against the escape of air from the top portion of the cylinder 12. The sleeve 22 has a flat face 27 thereon, as illustrated in FIGS. 2 and 3. A slidable element or block 28 is mounted on the sleeve 22 and is provided with a setscrew 29 extending inwardly from one end in alignment with the flat face 27. A plate 31 is mounted in a slot 32 in the element 28 and disposed adjacent to the flat face 27 against which it is urged with a predetermined pressure by the setscrew 29. After the pressure is adjusted, a nut 33 locks the setscrew 29 in secured position. This arrangement permits the element or block 28 to be slid up and down on the sleeve 22 and retained in any position to which it is moved.

A pair of switches 34 and 36 are secured to opposite sides of the slidable element 28 by screws 35. Each of the switches has operating plungers 37 extending upwardly therefrom in alignment with adjustable studs 38 and 39. The adjusting screws are supported by a plate 41 which is secured to the rod 21 by a clamping screw 42. The plate has a threaded stud 43 which is aligned with the slidable element 28 and disposed in position to be contacted thereby and moved downwardly therewith an amount equal to the amount of wear of the electrodes. Both of the plungers will be actuated when the electrodes 9 and 11 have clamped the thinner material to be welded. As the electrodes wear, the threaded stud will advance the slidable element 28 a greater amount on the sleeve 22 so as to have the switches 34 and 36 and studs 38 and 39 in the same relationship to each other when the electrodes are in position to engage the material to be welded. A chain 44 is secured to the slidable element 28 for returning it to its initial position when a new set of electrodes is installed in the welding gun.

When a weld is to be made on the thicker material to be welded, a flow of fluid is directed into the top of the cylinder through the conduit 46 to cause the piston 13 to move downwardly therein. This moves the link 17 and the pivot 18 downwardly to move the two electrodes into engagement with the material to be welded. The downward movement of the piston 13 moves the rod 21, the plate 41 and the studs 38 and 39 downwardly therewith. The stud 38 engages the plunger 37 of the switch 34 and moves it downwardly to complete a set of contacts contained therein. This will energize a relay in a time control device which is set to deliver the proper amount of current to the electrodes and material to produce the welding thereof. By reversing the flow of fluid to the cylinder and directing it into the conduit 47 below the piston 13, the piston will be retracted as the fluid thereabove moves from the cylinder out through the conduit 46.

When the electrodes are employed to weld material which is of less over-all thickness, the movement of the piston downwardly causes the electrodes 9 and 11 to engage the material to be welded. This moves the plate 41 downwardly a greater amount, sufficient to have the stud 39 move the plunger 37 and close the contacts of the switch 36. This energizes a relay in a second time control device which delivers a lesser amount of current to the electrodes 9 and 11 to produce the welding of the material. While the switch 34 was actuated at the time the contacts of the switch 36 were closed, the latter operated a relay which opened the circuit to the relay of the first time control device and rendered it inoperative while energizing a relay of the second time control device. Lock nuts 48 are mounted on the studs 38, 39 and 43 to lock them in adjusted position. An inverted cup-shaped cover 49 is secured to the head 25 of the cylinder to enclose the control device above described. The chain 44 extends through an aperture in the cup and has a ring 50 on the end thereof, a pair of conductors 51 extends from the switch 34 to one of the time control devices, while a second pair of conductors 52 extends from the switch 36 to the other time control device. The conductors pass through a grommet 53 in the wall of the cover 49.

It will be seen that the current control device of the present invention may be applied to the head of an operating cylinder of a portable welding device. When the piston is operated in the cylinder, adjusted studs move downwardly to operate one or both of the pair of switches for completing a circuit to a relay in a time control device which selects the proper amount of current to be employed to weld the material which may vary in thickness. As the welding electrodes wear and are moved farther in order to engage the material to be welded, the switches are advanced a corresponding amount so as to operate in a like manner on materials of different thickness when engaged by the electrodes. When the worn electrodes are replaced, the chain 44 is pulled upwardly to return the slidable element 28 to its initial position. The slidable element for the switches has frictional engagement with a flat section of a supporting sleeve which maintains it in advanced position. When the device is attached to a welding gun, it automatically controls the amount of current delivered to the material to be welded which is of different thickness, to provide assurance that sufficient current is delivered to the electrodes to make a satisfactory weld each welding operation.

What is claimed is:

1. In a welding device having movable electrodes, means for moving the electrodes into clamped relation with material to be welded, a rod actuated by said movable means, a plate on said rod, a pair of adjustable studs on said plate, a pair of switches supported in the path of movement of said studs one or both of which are operated when the electrodes are moved into engagement with the material to be welded depending upon the over-all thickness thereof, conductors leading from the switches to current supply sources, and means rendering the supply source through one switch ineffective when both switches are operated.

2. In a welding device having movable electrodes, means for moving the electrodes into clamped relation with material to be welded, a rod actuated by said movable means, a plate on said rod, a pair of adjustable studs on said plate, a pair of switches mounted on a slidable support in the path of movement of said studs one or both of which are operated when the electrodes are moved into engagement with the material to be welded depending upon the over-all thickness thereof, conductors leading from the switches to current supply sources, and an adjustable stud carried by said plate in position to advance said switches on said support as the electrodes wear.

3. In a welding device having movable electrodes, means for moving the electrodes into clamped relation with material to be welded, a rod actuated by said movable means, a plate on said rod, a pair of adjustable studs on said plate, a pair of switches mounted on a slidable support in the path of movement of said studs one or both of which are operated when the electrodes are moved into engagement with the material to be welded depending upon the over-all thickness thereof, conductors leading from the switches to current supply sources, an adjustable stud carried by said plate in position to advance said switches on said support as the electrodes wear, and means for returning said switches when the electrodes are replaced.

4. The combination with a welding device having a pair of electrodes and a piston within a cylinder for moving the electrodes into clamped relationship with material to be welded, a rod movable with the piston, a sleeve sealed to said cylinder and rod for preventing the escape of fluid from the cylinder, a slidable element on said sleeve, a pair of switches supported by said slidable element, a plate on said rod having adjustable fingers for engaging and actuating said switches in sequence depending upon the degree of movement of the plate which conforms to the over-all thickness of the material to be welded, conductors leading from the switches to current supply sources for different thickness of materials to be welded, and means rendering the supply source through one switch ineffective when both switches are operated.

5. The combination with a welding device having a pair of electrodes and a piston within a cylinder for moving the electrodes into clamped relationship with material to be welded, a rod movable with the piston, a sleeve sealed to said cylinder and rod for preventing the escape of fluid from the cylinder, a slidable element on said sleeve, a pair of switches supported by said slidable element, conductors leading from said switches to current supply sources for different thicknesses of material to be welded, a plate on said rod having adjustable fingers for engaging and actuating said switches in sequence depending upon the degree of movement of the plate which conforms to the over-all thickness of the material to be welded, a stud on said plate disposed substantially in engagement with said slidable element when the electrodes are in engagement with the workpiece for advancing the slidable element and the switches as the electrodes wear, and means carried by said slidable element for returning the element and switches to their initial position when the electrodes are replaced.

6. The combination with a welding device having a pair of electrodes and a piston within a cylinder for moving the electrodes into clamped relationship with material to be welded, a rod movable with the piston, a sleeve sealed to said cylinder and rod for preventing the escape of fluid from the cylinder, a slidable element on said sleeve, a pair of switches supported by said slidable element, conductors leading from said switches to current supply sources for different thicknesses of material to be welded, a plate on said rod having adjustable fingers for engaging and actuating said switches in sequence depending upon the degree of movement of the plate which conforms to the over-all thickness of the material to be welded, a stud on said plate disposed substantially in engagement with said slidable element when the electrodes are in engagement with the workpiece for advancing the slidable element and the switches as the electrodes wear, means carried by said slidable element for returning the element and switches to their initial position when the electrodes are replaced, and means carried by said slidable element for engaging said sleeve with a predetermined pressure.

7. The combination with a welding device having a pair of electrodes and a piston within a cylinder for moving the electrodes into clamped relationship with material to be welded, a rod movable with the piston, a sleeve sealed to said cylinder and rod for preventing the escape of fluid from the cylinder, a slidable element on said sleeve, a pair of switches supported by said slidable element, conductors leading from said switches to current supply sources for different thicknesses of material to be welded, a plate on said rod having adjustable fingers for engaging and actuating said switches in sequence depending upon the degree of movement of the plate which conforms to the over-all thickness of the material to be welded, a stud on said plate disposed substantially in engagement with said slidable element when the electrodes are in engagement with the workpiece for advancing the slidable element and the switches as the electrodes wear, means carried by said slidable element for returning the element and switches to their initial position when the electrodes are replaced, means carried by said slidable element for engaging said sleeve with a predetermined pressure, an inverted cup enclosing said rod, switches and plate, and means for securing the cup to the end of the cylinder.

References Cited in the file of this patent
UNITED STATES PATENTS

| | | |
|---|---|---|
| 1,848,905 | Rabezzana | Mar. 8, 1932 |
| 2,313,941 | Humphrey | Mar. 16, 1943 |
| 2,494,847 | Welch | Jan. 17, 1950 |
| 2,498,492 | Heuschkel | Feb. 21, 1950 |
| 2,892,068 | Park | June 23, 1959 |